No. 885,075. PATENTED APR. 21, 1908.
D. S. OAKLEY.
CLUTCH.
APPLICATION FILED JUNE 1, 1907.
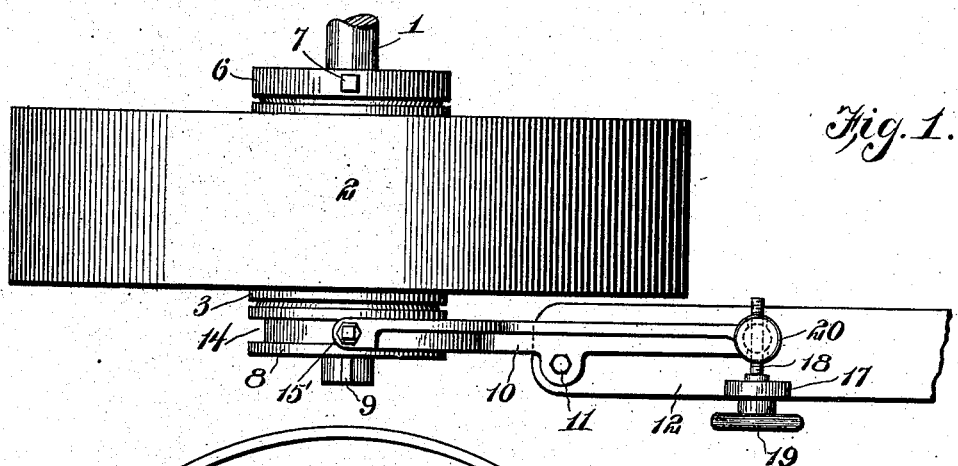
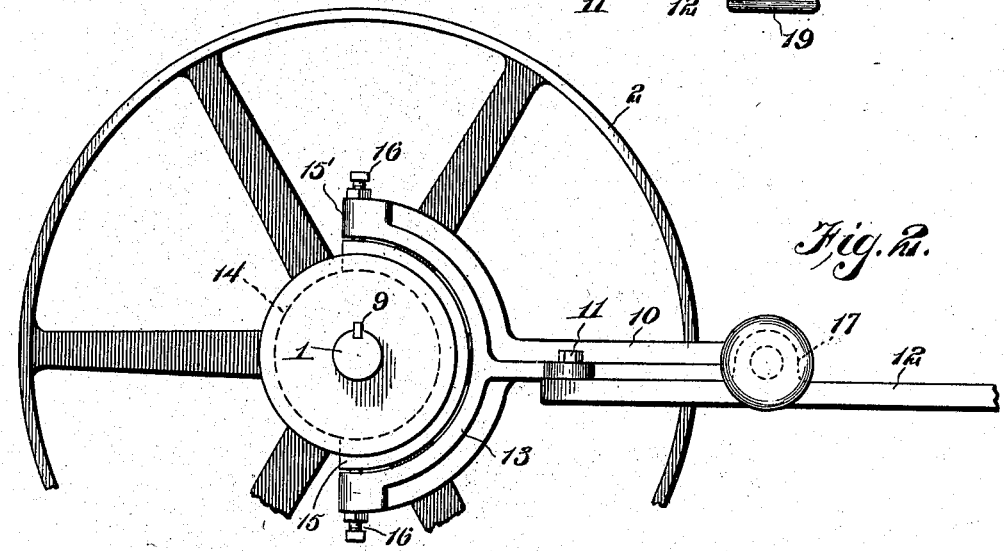
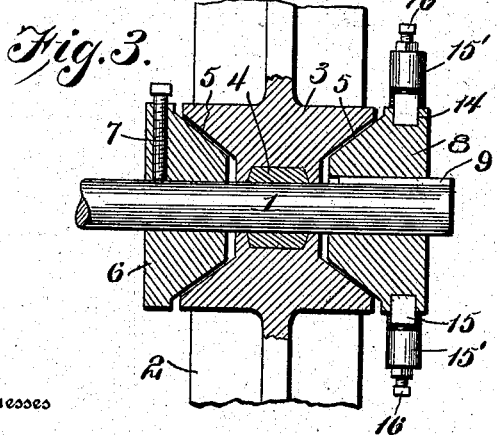
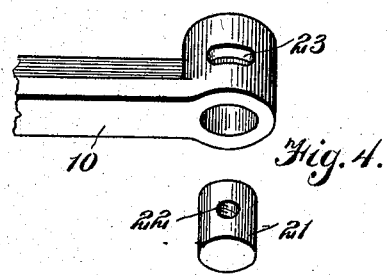
Inventor
David S. Oakley
Witnesses
Louis R. Heinrichs
C. Bradway
By Victor J. Evans
Attorney

UNITED STATES PATENT OFFICE.

DAVID S. OAKLEY, OF PARKERSBURG, WEST VIRGINIA.

CLUTCH.

No. 885,075.      Specification of Letters Patent.      Patented April 21, 1908.

Application filed June 1, 1907. Serial No. 376,773.

*To all whom it may concern:*

Be it known that I, DAVID S. OAKLEY, a citizen of the United States, residing at Parkersburg, in the county of Wood and State of West Virginia, have invented new and useful Improvements in Clutches, of which the following is a specification.

This invention relates to a clutch for connecting a driven element or wheel to a driving element or shaft when it is desired to transmit power.

The invention has for one of its objects to improve and simplify the construction of devices of this character so as to be comparatively easy and inexpensive to manufacture, of substantial and durable design, and capable of producing a powerful clutching effect.

A further object of the invention is the provision of a clutch comprising relatively movable cones mounted on the driving element and adapted to engage hollow cones on the opposite sides of the hub of the wheel or driven element, one of the cones being thrown into and out of engagement by means of a screw-actuated lever.

With these objects in view and others, as will appear as the description proceeds, the invention comprises the various novel features of construction and arrangement of parts which will be more fully described hereinafter and set forth with particularity in the claims appended hereto.

In the accompanying drawing, which illustrates one of the embodiments of the invention, Figure 1 is a plan view of the clutch applied to a rotatable shaft and pulley. Fig. 2 is a side view of the clutch device. Fig. 3 is a vertical longitudinal section of the clutching elements. Fig. 4 is a detail perspective view of parts of the means for actuating the clutch.

Similar reference characters are employed to designate corresponding parts throughout the several views.

Referring to the drawing, 1 designates a rotatable driving shaft on which is loosely mounted a driving element, which, in the present instance, represents a belt pulley 2, the hub 3 of the latter having a bushing of babbitt 4. The ends of the hub 3 are provided with hollow cones 5 that form part of the clutching device. On the shaft 1 is a relatively fixed cone 6 secured by a jam screw 7, as shown in Fig. 3, which cone is adapted to engage in one of the conical depressions 5 of the hub. Also on the shaft 1 is a sliding cone 8 arranged to engage in the conical depression 5 in the opposite end of the hub, the said cone being slidably connected with the shaft by a spline 9. The cone 8 is adapted to be moved longitudinally of the shaft and when moved in one direction, will engage the pulley and throw the latter toward the relatively fixed cone 6 so that the wheel will be clamped between the cones and hence rotate with the shaft, while a movement of the cone 8 in the opposite direction will, of course, release the wheel.

The mechanism for clutching and unclutching the parts comprises a lever 10 fulcrumed at 11 on a stationary support 12 and having its inner end formed into a yoke 13 that spans the cone 8. The cone has a peripheral groove 14 in which engages an approximately semi-annular member 15. The ends of the yoke 13 are formed into diametrically arranged eyes 15' through which extend bolts 16 that engage in openings in the member 15 which bolts constitute hinge joints between the operating lever and member 15. On the stationary support 12 is an upwardly projecting lug 17 in which is journaled an adjusting screw 18, the latter having a hand wheel or grip 19 for convenient manipulation. The lever 10 has a hollow cylindrical head 20 at its outer end in which is a cylindrical block 21. This block has a threaded opening 22, as shown in Fig. 4, for receiving the screw 18, and the head has slots 23 arranged in alinement with the opening 22 for receiving the screw. By operating the screw 18, the lever can be moved back and forth for clutching and unclutching the wheel or pulley and as the screw engages in the cylindrical block 21, the lever can move back and forth with perfect freedom. This screw enables a powerful clutching effect to be produced so that the wheel will rotate with the shaft without slipping.

The clutch is comparatively simple, durable and highly effective in use.

From the foregoing description, taken in connection with the accompanying drawing, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative and that such changes may be made when desired, as are within the scope of the claims.

Having thus described the invention, what I claim is:—

1. The combination of a clutch, with a mechanism for throwing the clutch into or out of operation, said mechanism comprising a lever provided with a head having slots, a support on which the lever is fulcrumed, an operating screw journaled on the support and loosely extending through the slots of the head and disposed with its axis at right angles to the axis on which the lever moves, and a block mounted for relative turning movement in the head and having a tapped opening for receiving the screw.

2. A device of the class described comprising clutching members one having a peripheral groove, a semi-annulus disposed in the groove, a bifurcated lever, bolts for detachably and hingedly connecting the lever and annulus at diametrically opposite points and at the ends of the annulus, and means for operating the lever.

3. In a device of the class described, the combination of clutching members, an operating lever, means for connecting the lever with one of the members, a hollow cylindrical head on the lever having diametrical slots, a block loosely mounted in the head, and an adjusting screw threaded in the block and extending through the slots of the head.

4. In a device of the class described, the combination of clutching elements, one having an annular groove, an approximately semi-circular member in the groove, a lever having a bifurcated end spanning the said member, a hinged connection between the extremity of each bifurcation and adjacent end of the member, a support for the lever, an operating screw on the support, a head on the lever, and a block mounted on the head in which the screw has a threaded engagement.

5. In a device of the class described, the combination of a wheel having a hub provided with oppositely disposed hollow cones, a shaft passing through the hub, a cone clamped to the shaft to engage one of the hollow cones, a sliding cone rotatable with the shaft and arranged to engage the other hollow cone and having a peripheral groove, a semi-annular member engaging in the groove, a lever hingedly connected at diametrically opposite points with the member, a support for the lever, a screw mounted on the support, a hollow head on the lever having diametrically arranged slots, and a block looosely mounted in the head with which the screw has a threaded engagement.

In testimony whereof, I affix my signature in presence of two witnesses.

DAVID S. OAKLEY.

Witnesses:
NORTON L. UPSON,
V. HENDERSHOT.